United States Patent
O'Shea et al.

(10) Patent No.: US 8,525,099 B2
(45) Date of Patent: Sep. 3, 2013

(54) TEMPORAL BASED MOTION SENSOR REPORTING

(75) Inventors: Terrance J. O'Shea, Portland, OR (US); Tom E. Pearson, Beaverton, OR (US)

(73) Assignee: Intel-GE Care Innovations LLC, Roseville, CA (US)

( * ) Notice: Subject to any disclaimer, the term of this patent is extended or adjusted under 35 U.S.C. 154(b) by 337 days.

(21) Appl. No.: 12/969,318

(22) Filed: Dec. 15, 2010

(65) Prior Publication Data

US 2012/0155602 A1 Jun. 21, 2012

(51) Int. Cl.
*H01J 40/14* (2006.01)

(52) U.S. Cl.
USPC ... 250/221; 250/214 R; 340/506; 340/539.13; 340/573.1

(58) Field of Classification Search
USPC ............ 250/221, 222.1, 214 R; 340/506, 340/539.13, 539.26, 540, 573.1; 382/100, 382/103
See application file for complete search history.

(56) References Cited

U.S. PATENT DOCUMENTS

2008/0238692 A1* 10/2008 Dayton et al. ............. 340/573.1

OTHER PUBLICATIONS

O'Shea et al., "Technologies for Ambient Assisted Living:", White Paper, Intel Digital Health, 2010, 5 pages.

* cited by examiner

*Primary Examiner* — Kevin Pyo
(74) *Attorney, Agent, or Firm* — Pillsbury Winthrop Shaw Pittman LLP

(57) ABSTRACT

Methods and systems may include a motion sensor and logic to sample an output signal of the motion sensor. The logic can also be configured to track an amount of time the motion sensor is triggered based on the output signal, and transmit the amount of time over a wireless link on a periodic basis.

22 Claims, 4 Drawing Sheets

TEMPORAL BASED MOTION SENSOR REPORTING

BACKGROUND

1. Technical Field

Embodiments generally relate to motion sensing. More particularly, embodiments relate to tracking the amount of time wireless motion sensors are triggered.

2. Discussion

Conventional motion sensing solutions may involve the use of event driven motion sensors that are networked with an aggregator, wherein each sensor begins reporting "motion events" to the aggregator when motion is first sensed and thereafter on a prescribed schedule (e.g., every six seconds) until the motion is no longer sensed. The aggregator may then use software to determine total motion time in the area covered by the remote sensors based on the motion events received from the sensors. While such an approach can be suitable under certain circumstances, there still remains considerable room for improvement. For example, event driven sensing may be prone to false, periodic and/or intermittent triggers, which can have a negative impact on accuracy. Moreover, continually reporting data to the aggregator could significantly decrease the battery life of the sensors, particularly in the case of wirelessly networked sensors.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a system having a motion sensor and logic to sample an output signal of the motion sensor, and track the amount of time the motion sensor is triggered based on the output signal. The logic can also transmit the amount of time over a wireless link on a periodic basis.

Embodiments can also include a computer readable storage medium having a set of stored instructions which, if executed by a processor, cause a computer to sample an output signal of a motion sensor, and track the amount of time the motion sensor is triggered based on the output signal. The instructions, if executed, may also cause a computer to transmit the amount of time over a wireless link on a periodic basis.

Other embodiments may involve a method in which an output signal of a passive infrared motion sensor is sampled. The method can also provide for conducting a repetitive increment of a counter value in response to a first trigger event in the output signal, wherein the first trigger event includes a rising edge transition and corresponds to detected motion. The repetitive increment can be conducted in accordance with a clock timer. The method may also provide for discontinuing the repetitive increment in response to a second trigger event in the output signal, wherein the second trigger event includes an expiration of a first idleness period after a falling edge transition and the falling edge transition corresponds to a lack of detected motion. In addition, the method may involve adding the counter value to a cumulative value in response to the second trigger event, wherein the cumulative value indicates an amount of time the passive infrared motion sensor is triggered. The method can also provide for activating a wireless interface, transmitting the cumulative value via the wireless interface, and deactivating the wireless interface in response to receiving an acknowledgement of the cumulative value transmission.

Figure 1:
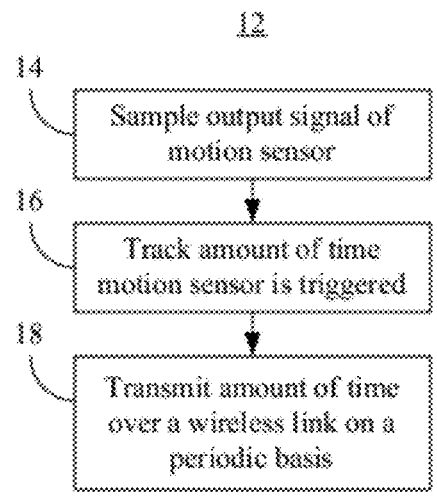
FIG. 1 is a flowchart of an example of a method of determining the amount of time a motion sensor is triggered according to an embodiment.

Turning now to FIG. 1, a method 12 of determining the amount of time a motion sensor is triggered is shown. The method 12 and other methods described herein may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware logic using circuit technology such as application specific integrated circuit (ASIC), complementary metal oxide semiconductor (CMOS) or transistor-transistor logic (TTL) technology, or any combination thereof. For example, computer program code to carry out operations shown in method 12 may be written in any combination of one or more programming languages, including an object oriented programming language such as Java, Smalltalk, C++ or the like and conventional procedural programming languages, such as the "C" programming language or similar programming languages. In particular, the method 12 can be implemented on a logic board containing the motion sensor.

Processing block 14 provides for sampling an output signal of the motion sensor. The amount of time that the motion sensor is triggered may be tracked at block 16, wherein illustrated block 18 provides for transmitting the amount of time over a wireless link on a periodic basis. As will be discussed in greater detail, tracking the amount of time that the motion sensor is triggered can obviate accuracy concerns associated with event driven sensing, and transmitting the amount of time on a periodic basis can provide substantial power savings and significantly extended battery life.

Figure 2:
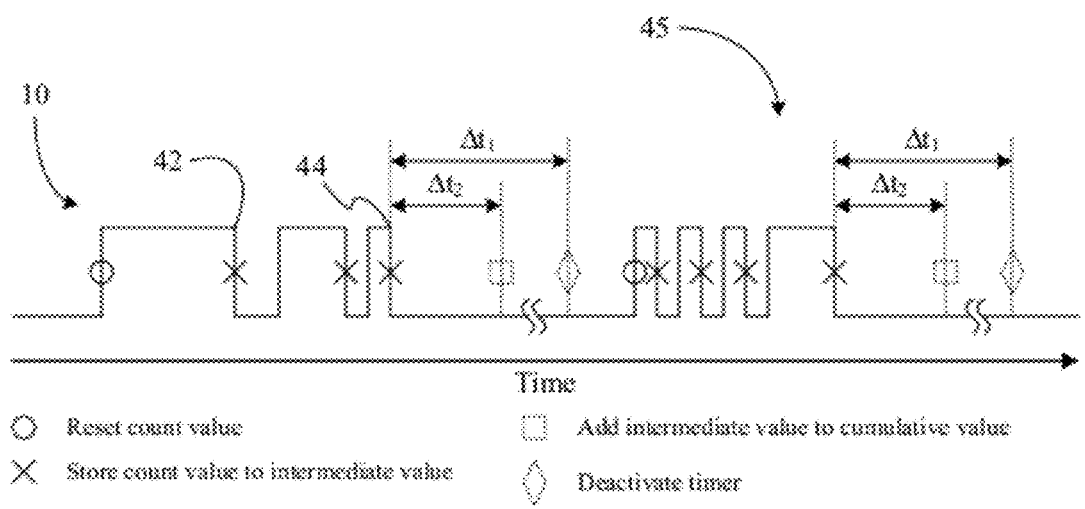
FIG. 2 is a signal diagram of an example of an output signal of a motion sensor according to an embodiment.

FIG. 2 shows an output signal 10 of a motion sensor such as a passive infrared (PIR, pyroelectric) motion sensor that does not emit energy and can detect the movement of nearby individuals by reading relative energy (e.g., heat) changes in the field of view of the sensor. Generally, the illustrated output signal 10 transitions to a high value (i.e., exhibits a rising edge transition, indicated with an "O") when motion is detected by the sensor. The illustrated output signal 10 remains high until motion is no longer detected, wherein a lack of detected motion causes the output signal 10 to transition to a low value (i.e., exhibit a falling edge transition, indicated with an "X"). Alternative signaling schemes such as an inverted scheme in which a rising edge transition corresponds to a lack of detected motion and a falling edge transition corresponds to detected motion, or a level based scheme in which one voltage level corresponds to detected motion and another voltage level corresponds to a lack of detected motion, might also be used.

Figure 3:
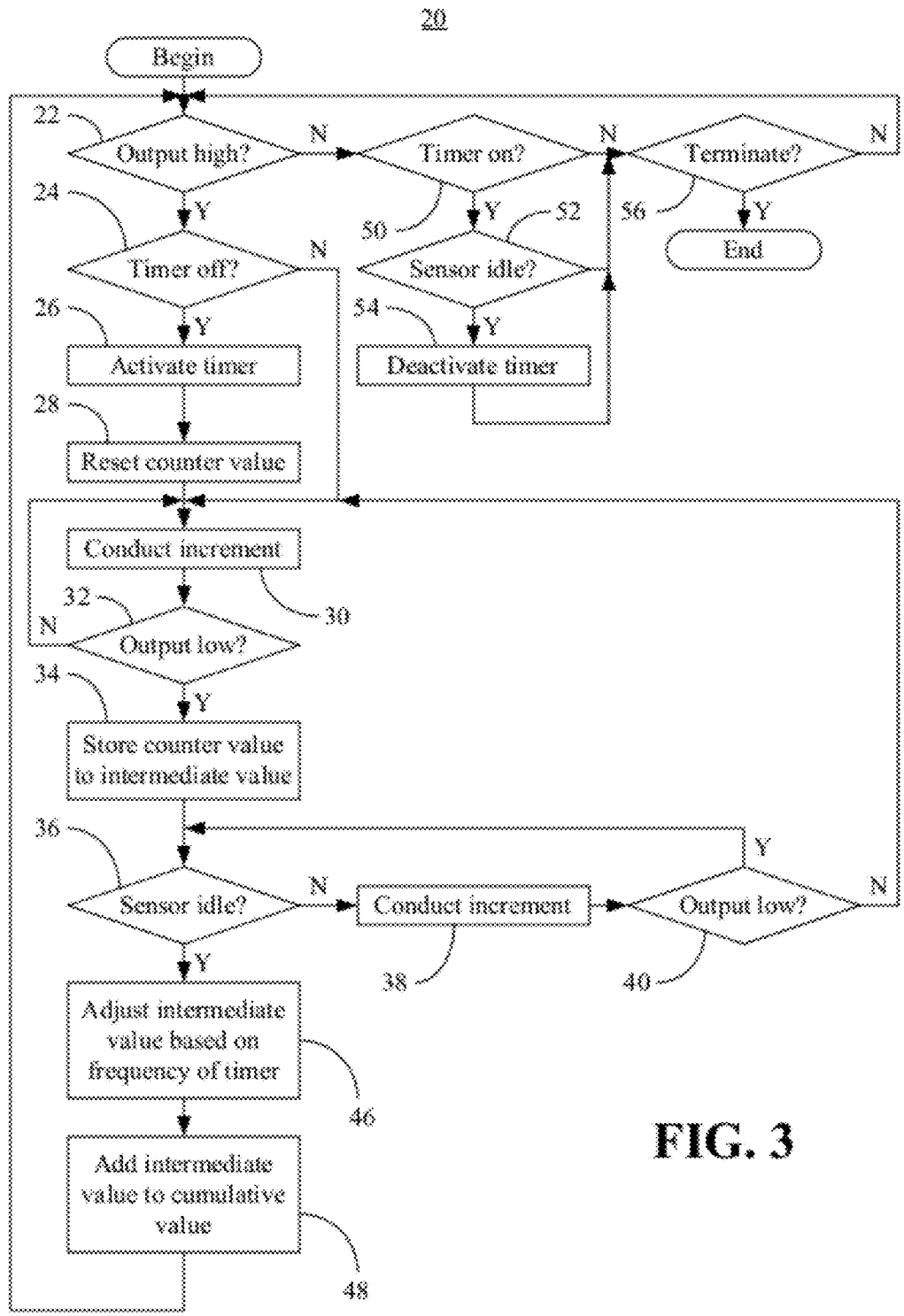
FIG. 3 is a flowchart of an example of a method of using a counter value to determine the amount of time a motion sensor is triggered according to an embodiment.

FIG. 3 shows a detailed method 20 of using a counter value to determine the amount of time a motion sensor is triggered.

With continuing reference to FIGS. 2 and 3, processing block 22 provides for determining whether the sampled output signal is high. If so, illustrated block 24 determines whether a counter timer is deactivated. In this regard, the motion sensor or other system component may be equipped with a clock that provides a timer output that might be used in the tracking process. Moreover, in periods of extended idleness (e.g., upon expiration of idleness period $\Delta t_1$), the timer could be deactivated in order to conserve power and extend battery life. If it is determined that the timer has been deactivated, block 26 can provide for activating the clock timer and block 28 can provide for resetting a counter value (e.g., "timer_count" variable).

Illustrated block 30 conducts an increment of the counter value in accordance with the clock timer. For example, if the clock timer has an operating frequency of 2 Hz, every ½ second the counter value would be incremented by one. A determination may be made at block 32 as to whether the output signal is low (i.e., whether a falling edge transition has occurred). If not, the increment of the counter value at block 30 can be repeated. If the output signal has transitioned to the low state, the illustrated method 20 enables a determination to be made as to whether the transition corresponds to a "false positive" condition. In particular, another idleness period (e.g., idleness period $\Delta t_2$) may be effectively added to the end of each falling edge transition to ensure that the transition was not associated with a scenario in which the infrared footprint of an individual is not moving fast enough or the individual has stopped momentarily.

Thus, illustrated block 34 stores the counter value to an intermediate value (e.g., "last_falling_edge" variable) locally at the motion sensor. If it is determined at block 36 that the idleness period $\Delta t_2$ has not expired, an increment of the counter value may be conducted at block 38 and a determination can be made at block 40 as to whether the output signal is still low. If so, the sensor idleness check at block 36 may be repeated. Otherwise, the illustrated process returns to the repetitive increment of the counter value at block 30. Thus, if, as in the case of falling edge transition 42, the output signal 10 transitions high again before expiration of the idleness period $\Delta t_2$, the increment of the counter value can continue as if the falling edge transition 42 had not occurred.

If, on the other hand, the output signal 10 does not transition high again before expiration of the idleness period $\Delta t_2$, as in the case of falling edge transition 44, the illustrated method 20 enables the most recent falling edge transition 44 to be used in the determination of the amount of time that the motion sensor has been triggered. In particular, block 46 provides for adjusting the intermediate value, which is effectively the counter value of the most recent falling edge transition previously stored in block 34, based on the operating frequency of the clock timer in order to obtain the amount of time in seconds. For example, if the frequency of the clock timer is 2 Hz, the counter value is incremented every ½ second and the adjustment at block 46 may involve dividing the intermediate value by two. If, on the other hand, the frequency of the clock timer is 3 Hz, the adjustment at block 46 could divide the intermediate value by three. Illustrated block 48 adds the intermediate value to a cumulative value (e.g., "total_motion_time"), which indicates the total amount of time the motion sensor is triggered. An intermediate value can also be calculated for the trigger sequence 45 of the output signal 10 and added to the cumulative value to update the amount of time the motion sensor is triggered.

As already noted, the clock timer can be deactivated during times of extended idleness (e.g., upon expiration of idleness period $\Delta t_1$) to reduce power consumption and increase battery life. In particular, if it is determined at block 22 that the output signal is low, block 50 may determine whether the clock timer is activated. If the clock timer activated, a determination can be made at block 52 as to whether the extended idleness period $\Delta t_1$ has expired. If so, illustrated block 54 provides for deactivating the clock timer. A determination may be made at block 56 as to whether to terminate the method 20 or return to block 22.

Figure 4:
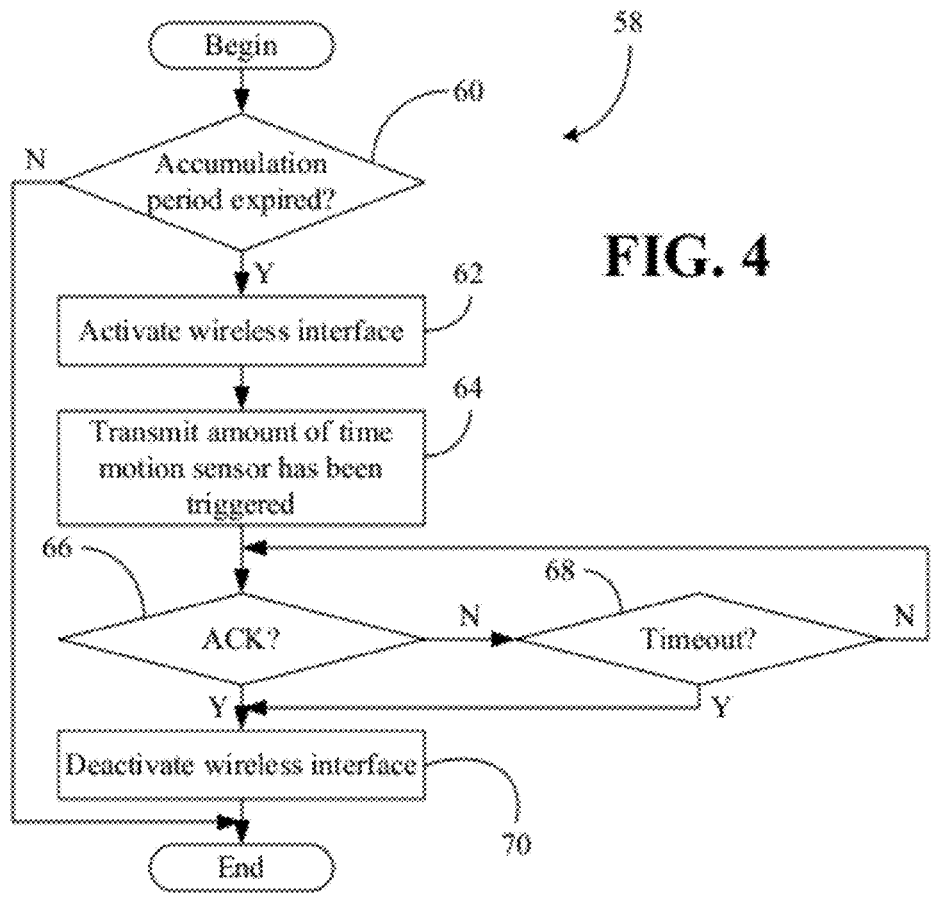
FIG. 4 is a flowchart of an example of a method of reporting the amount of time a motion sensor is triggered according to an embodiment.

FIG. 4 demonstrates that further power savings may be achieved by transmitting the amount of time on a periodic basis in method 58. For example, illustrated block 60 provides for determining whether an accumulation period has expired. The accumulation period might be a relatively long period of time such as thirty minutes so as to take advantage of the deactivation of a wireless interface, which can be activated at block 62. Alternatively, a wired interface could be used. The amount of time that the motion sensor has been triggered may be transmitted via the wireless interface at block 64. The transmission might be directed to a data aggregator associated with a system that collects information about occupants' activity in their homes and evaluates the activity in terms of nutrition, activity and cognition indices. Illustrated block 66 provides for determining whether an acknowledgement (ACK) has been received from the intended recipient of the amount of time transmission. If no acknowledgement has been received and it is determined at block 68 that a timeout has not occurred, the system may check again for an acknowledgement. If a timeout has occurred or an acknowledgement has been received, block 70 provides for deactivating the wireless interface.

Figure 5:
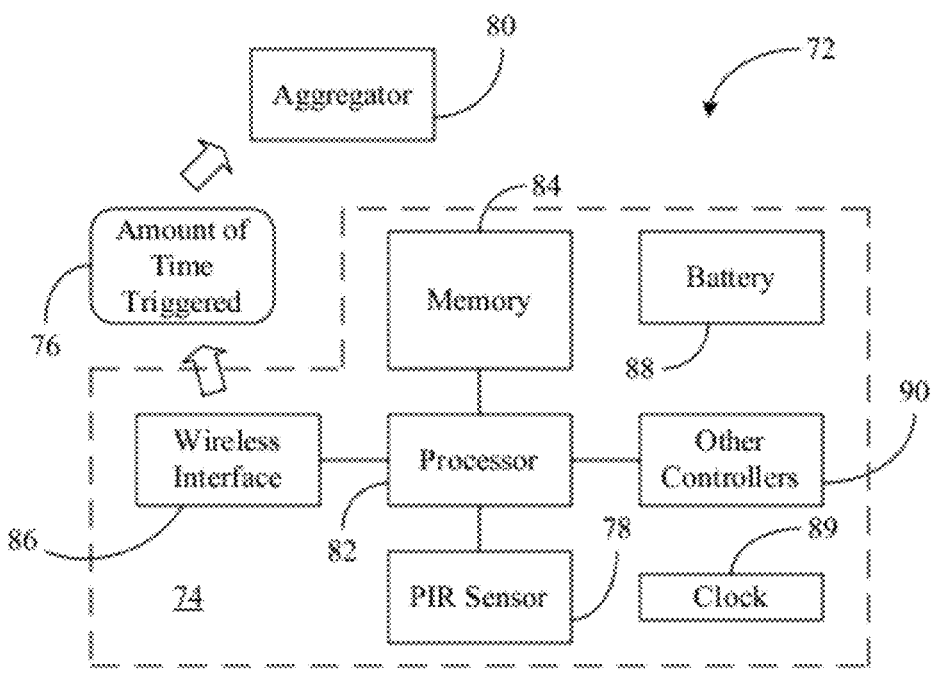
FIG. 5 is a block diagram of an example of a system according to an embodiment.

FIG. 5 shows a system 72 in which a motion sensor assembly 74 is configured to determine the amount of time 76 that a PIR sensor 78 has been triggered, and transmit the amount of time 76 to an aggregator 80 on a periodic basis. The motion sensor assembly 74 might be one of several passive motion sensing devices positioned throughout the home of an individual such as a senior, wherein the amount of time 76 the individual spends in a given area can be indicative of nutritional, cognitive, and/or activity state. For example, if the motion sensor assembly 74 is installed in a kitchen and the amount of time 76 indicates that the individual has spent a relatively short amount of time in the field of view of the PIR sensor 78, a determination could be made that the individual is not eating sufficiently. Alternatively, if the motion sensor assembly 74 is installed in a bathroom and the amount of time 76 indicates that the individual has spent a relatively long amount of time in the field of view of the PIR sensor 78, a determination might be made that the individual is having health problems related to bathroom activity.

As already noted, the amount of time 76 can be accumulated on the motion sensor assembly 74 using a clock timer, counter value, intermediate value and a cumulative value, which identifies the amount of time 76 that the PIR sensor 78 has been triggered during the accumulation period. The illustrated motion sensor assembly 74 includes a processor (e.g., embedded microcontroller, general purpose central processing unit/CPU) 82, memory 84, a wireless interface 86, a battery 88, a clock 89, and one or more other controllers 90. The processor 82 may include one or more processor cores (not shown) capable of executing a set of stored logic instructions to implement methods such as a portion or all of the method 12 (FIG. 1), the method 20 (FIG. 3), and/or the method 58 (FIG. 4), already discussed.

The memory 84 might include RAM and/or non-volatile memory suitable for storing counter values, intermediate values and cumulative values representative of the amount of time that the PIR sensor 78 is triggered. The wireless interface

86 could provide off-platform communication functionality in a wide variety of modes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Low-Rate Wireless PAN (e.g., IEEE 802.15.4-2006, LR-WPAN), Bluetooth (e.g., IEEE 802.15.1-2005,Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony modes. In addition, the other controllers 90 could provide support for user interface devices such as a display, keypad, mouse, etc. in order to allow a user to interact with and perceive information from the motion sensor assembly 74. Thus, the amount of time 76 and other information could also be output via the other controllers 90.

Figure 6:
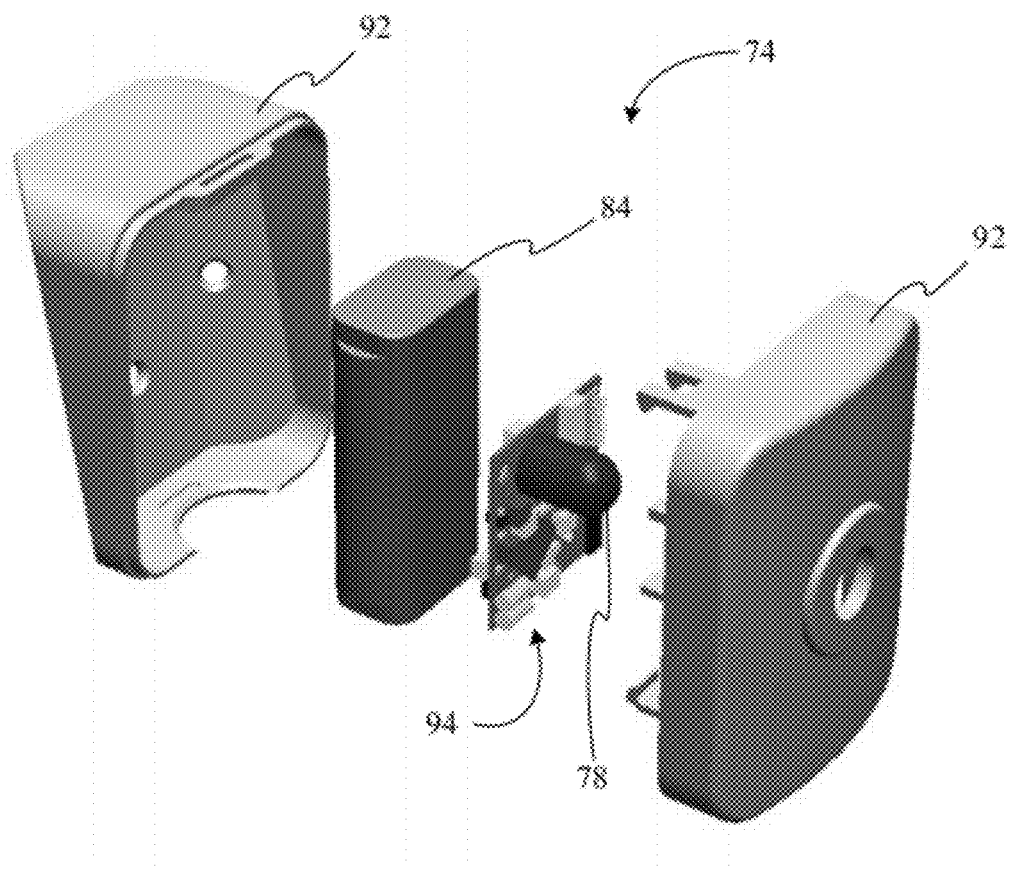
FIG. 6 is an exploded perspective view of an example of a motion sensor assembly according to an embodiment.

Turning now to FIG. 6, a perspective view of a motion sensor assembly 74 includes a battery 84 and a logic board 94 having a PIR sensor 78 mounted thereon, wherein the battery 84, logic board 94 and PIR sensor 78 are disposed within a protective housing 92. The logic board 94 can also include a processor, wireless interface, memory and other controllers, wherein the motion sensor assembly 74 samples an output signal of the PIR sensor 78, tracks the amount of time the PIR sensor 78 is triggered based on the output signal, and transmits the amount of time over a wireless link on a periodic basis, as already discussed.

Thus, the techniques described herein can significantly extend the battery life of motion sensors and improve the accuracy of monitoring sensors used for daily active living. For example, reducing false positives in a daily active living monitoring system can in turn reduce unnecessary, intrusive and costly interventions by monitoring staff. Moreover, an increase in the confidence of the alerts generated can be achieved.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    sampling an output signal of a passive infrared motion sensor;
    conducting a repetitive increment of a counter value in response to a first trigger event in the output signal, the first trigger event including a rising edge transition which corresponds to motion detected by the passive infrared motion sensor, and wherein the repetitive increment is conducted in accordance with a clock timer;
    discontinuing the repetitive increment in response to a second trigger event in the output signal, the second trigger event including an expiration of a first idleness period after a falling edge transition, wherein the falling edge transition corresponds to a lack of motion detected by the passive infrared motion sensor;
    adding the counter value to a cumulative value in response to the second trigger event, wherein the cumulative value indicates an amount of time the passive infrared motion sensor is triggered;
    activating a wireless interface;
    transmitting the cumulative value via the wireless interface; and
    deactivating the wireless interface in response to receiving an acknowledgement of the transmission of the cumulative value.

2. The method of claim 1, the method further including adjusting the counter value based on a frequency of the clock timer to obtain the amount of time the passive infrared motion sensor is triggered in seconds.

3. The method of claim 1, the method further including:
    deactivating the clock timer if a second idleness period of time has expired; and
    activating the clock timer in response to the first trigger event.

4. The method of claim 1, the method further including:
    conducting a plurality of repetitive increments of the counter value in response to a corresponding plurality of first trigger events in the output signal;

discontinuing the plurality of repetitive increments in response to a corresponding plurality of second trigger events in the output signal;

adding a plurality of counter values to the cumulative value, wherein each counter value corresponds to a second trigger event; and transmitting the cumulative value via the wireless interface on a periodic basis.

5. A non-transitory computer readable storage medium comprising a set of stored instructions which, if executed by a processor, cause a computer to:

sample an output signal of a motion sensor;

conduct a repetitive increment of a counter value in response to a first trigger event in the output signal, the first trigger event corresponding to motion detected by the motion sensor;

discontinue the repetitive increment in response to a second trigger event in the output signal, the second trigger event corresponding to a lack of motion detected by the motion sensor;

add the counter value to a cumulative value in response to the second trigger event, wherein the cumulative value indicates an amount of time the motion sensor is triggered; and transmit the cumulative value over a wireless link on a periodic basis.

6. The medium of claim 5, wherein the repetitive increment is conducted in accordance with a clock timer.

7. The medium of claim 6, wherein the instructions, if executed, cause the computer to adjust the counter value based on a frequency of the clock timer to obtain the amount of time the motion sensor is triggered in seconds.

8. The medium of claim 6, wherein the instructions, if executed, cause the computer to:

deactivate the clock timer if an idleness period of time has expired; and activate the clock timer in response to the first trigger event.

9. The medium of claim 6, wherein the instructions, if executed, cause the computer to:

conduct a plurality of repetitive increments of the counter value in response to a corresponding plurality of first trigger events in the output signal;

discontinue the plurality of repetitive increments in response to a corresponding plurality of second trigger events in the output signal; and add a plurality of counter values to the cumulative value, wherein each counter value corresponds to a second trigger event.

10. The medium of claim 5, wherein the first trigger event includes a rising edge transition and the second trigger event includes an expiration of an idleness period after a falling edge transition.

11. The medium of claim 5, wherein the instructions, if executed, cause the computer to:

activate a wireless interface;

transmit the cumulative value via the wireless interface;

receive an acknowledgement of the transmission of the cumulative value; and deactivate the wireless interface based on the acknowledgement.

12. A system comprising:

a motion sensor; and logic to:

sample an output signal of the motion sensor;

conduct a repetitive increment of a counter value in response to a first trigger event in the output signal, the first trigger event corresponding to motion detected by the motion sensor;

discontinue the repetitive increment in response to a second trigger event in the output signal, the second trigger event corresponding to a lack of motion detected by the motion sensor;

add the counter value to a cumulative value in response to the second trigger event, wherein the cumulative value indicates an amount of time the motion sensor is triggered; and transmit the cumulative value over a wireless link on a periodic basis.

13. The system of claim 12, the system further including a clock timer, wherein the repetitive increment is to be conducted in accordance with the clock timer.

14. The system of claim 13, wherein the logic is to adjust the counter value based on a frequency of the clock timer to obtain the amount of time the motion sensor is triggered in seconds.

15. The system of claim 13, wherein the logic is to:

deactivate the clock timer if an idleness period of time has expired; and activate the clock timer in response to the first trigger event.

16. The system of claim 13, wherein the logic is to:

conduct a plurality of repetitive increments of the counter value in response to a corresponding plurality of first trigger events in the output signal;

discontinue the plurality of repetitive increments in response to a corresponding plurality of second trigger events in the output signal; and add a plurality of counter values to the cumulative value, wherein each counter value corresponds to a second trigger event.

17. The system of claim 12, wherein the first trigger event includes a rising edge transition and the second trigger event includes an expiration of an idleness period after a falling edge transition.

18. The system of claim 12, the system further including a wireless interface, wherein the logic is to:

activate the wireless interface;

transmit the cumulative value via the wireless interface;

receive an acknowledgement of the transmission of the cumulative value; and deactivate the wireless interface based on the acknowledgement.

19. The medium of claim 10, wherein the idleness period comprises a time period during which the rising edge transition is not detected in the output signal.

20. The system of claim 17, wherein the idleness period comprises a time period during which the rising edge transition is not detected in the output signal.

21. The medium of claim 10, wherein the falling edge transition occurs when the output signal indicates the lack of motion, wherein the instructions, if executed, cause the computer to:

determine whether the falling edge transition has occurred based on the output signal;

store the counter value as an intermediate value in response to determining that the falling edge transition has occurred;

determine whether the idleness period has expired; and add the intermediate value to the cumulative value in response to determining that the idleness period has expired.

22. The system of claim 17, wherein the falling edge transition occurs when the output signal indicates the lack of motion, wherein the logic is to:
- determine whether the falling edge transition has occurred based on the output signal;
- store the counter value as an intermediate value in response to determining that the falling edge transition has occurred;
- determine whether the idleness period has expired; and
- add the intermediate value to the cumulative value in response to determining that the idleness period has expired.

* * * * *